UNITED STATES PATENT OFFICE.

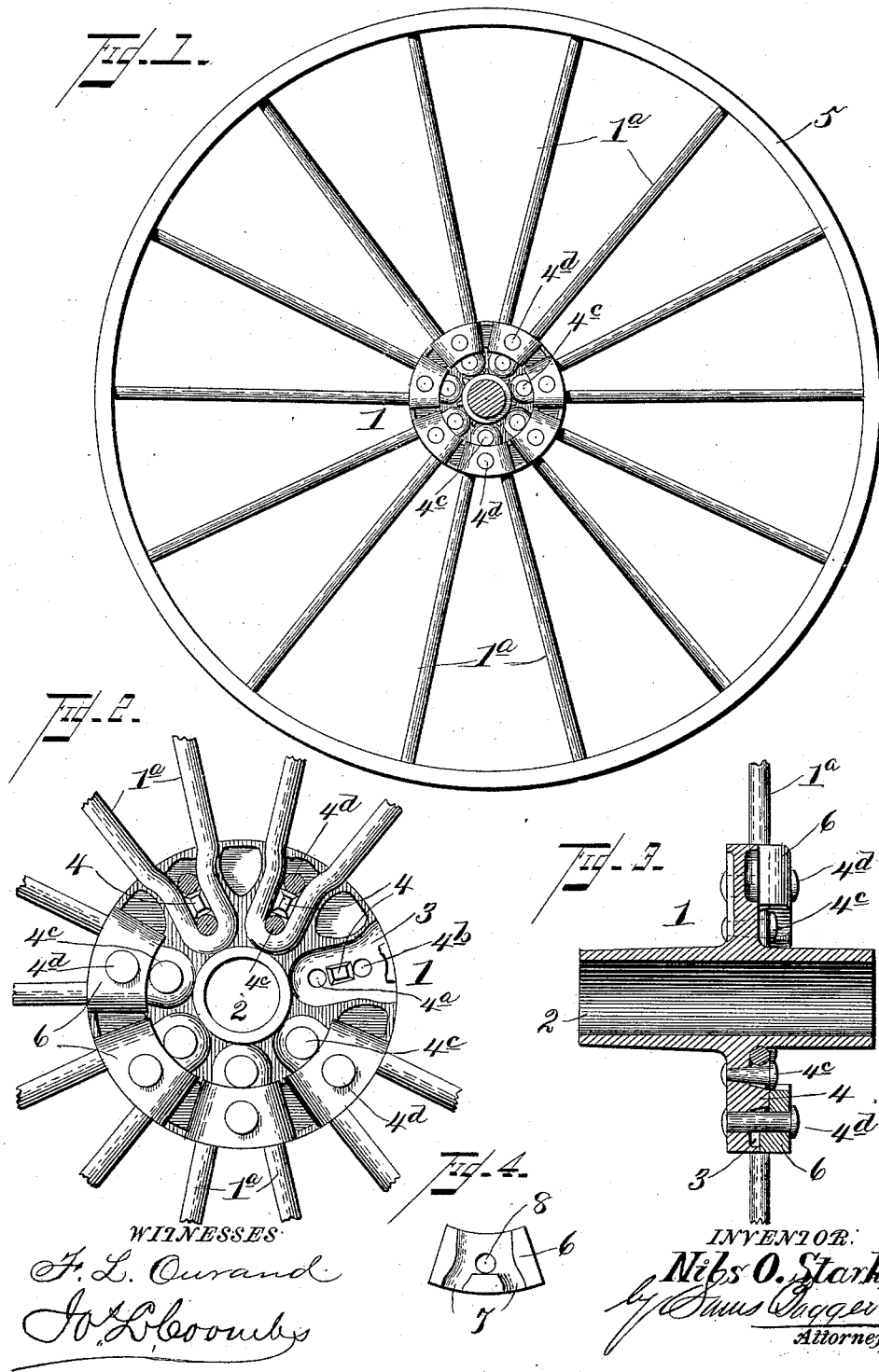

NILS O. STARKS, OF MADISON, WISCONSIN.

METAL WHEEL.

SPECIFICATION forming part of Letters Patent No. 469,606, dated February 23, 1892.

Application filed August 26, 1891. Serial No. 403,757. (No model.)

*To all whom it may concern:*

Be it known that I, NILS O. STARKS, a citizen of the United States, and a resident of Madison, in the county of Dane and State of Wisconsin, have invented new and useful Improvements in Metal Wheels; and I do hereby declare that the following is a full, clear, and exact description of the invention, which will enable others skilled in the art to which it appertains to make and use the same, reference being had to the accompanying drawings, which form a part of this specification.

My invention relates to improvements in wheels, in which the hub, spokes, and tire are made wholly of metal, its object being to improve upon such description of wheels and obtain superior advantages with respect to simplicity, economy, and efficiency.

The invention consists in the novel construction and combination of parts hereinafter fully described and claimed.

In the accompanying drawings, Figure 1 is a side view of a wheel, constructed in accordance with my invention. Fig. 2 is a view of the hub, some of the retaining-clamps being removed. Fig. 3 is a central sectional view of the same. Fig. 4 is a bottom plan view of the retaining-clamp.

In the said drawings, the reference-numeral 1 designates a cast-metal hub, having a central aperture 2 for the passage of the axle-spindle. One face or side of the hub is formed with a series of curved radial grooves 3, to receive the spokes hereinafter described. Between the radiating portions of each of these grooves is a lug or stud 4, formed with and projecting from the hub, and at the inner and outer sides of the lugs are formed apertures or holes $4^a$ and $4^b$ for the passage of bolts or rivets $4^c$ and $4^d$.

The numeral $1^a$ denotes the spokes made in pairs, each pair consisting of a single piece of metal, bent over at the center at the proper angle to form two spokes, and the bent portions inserted in the grooves 3 in the face of the hub, while the ends are secured to the tire 5.

The numeral 6 designates retaining-clamps of metal, each having two converging grooves 7 in its inner face and an aperture or hole 8.

In carrying the invention into effect, a metal bar or rod of any suitable shape in cross-section and of a length sufficient to form two spokes is bent over upon itself at the center at the proper angle and the bent portion inserted in one of the grooves in the hub which corresponds with said bent portion. A retaining-clamp is then placed upon said spokes with the hole 8 therein registering with the outer hole $4^b$ in the hub and secured thereto by means of bolt $4^d$, and the tapering bolts then drawn in between the bight of the spokes and the studs 4, thereby taking up any slack in the spokes. When all the grooves in the hub have the spokes inserted therein, the ends of the spokes are secured to the tire in any suitable manner.

Having thus described my invention, what I claim is—

The combination, with the hub having a series of curved radiating-grooves upon one face, the projecting lugs, and the apertures at the sides of said lugs, of the bars or rods bent over at their centers and inserted in said grooves, the clamps having converging grooves and bolt holes or apertures, the bolts securing said clamps to the hub, the tapered bolts for forcing the rods or bars inwardly, and the tires to which the ends of said rods or bars are secured, substantially as described.

In testimony that I claim the foregoing as my own I have hereunto affixed my signature in presence of two witnesses.

NILS O. STARKS.

Witnesses:
W. R. BAGLEY,
W. C. NOÉ.